United States Patent [19]

Werner

[11] 4,299,078
[45] Nov. 10, 1981

[54] MOWER-CONDITIONER
[75] Inventor: Anton Werner, Saverne, France
[73] Assignee: Kuhn, S.A., Saverne, France
[21] Appl. No.: 45,325
[22] Filed: Jun. 4, 1979
[30] Foreign Application Priority Data
Jun. 13, 1978 [FR] France .............................. 78 18644
[51] Int. Cl.³ ..................... A01D 35/26; A01D 43/10; A01D 57/02
[52] U.S. Cl. ..................................... 56/14.5; 56/16.4; 56/DIG. 1; 56/14.1
[58] Field of Search ..................... 56/14.1, 14.2, 14.6, 56/DIG. 1, 16.4, 14.5

[56] References Cited
U.S. PATENT DOCUMENTS 3,479,805 11/1969 Soteropulos ......................... 56/14.2
3,699,755 10/1972 Hauser ............................ 56/DIG. 1
3,722,190 3/1973 Fisher ............................. 56/DIG. 1
4,055,037 10/1977 Dosterling et al. ............. 56/DIG. 1

OTHER PUBLICATIONS

"All in One Harvester", 8-1953, Popular Mechanics.

Primary Examiner—Robert A. Hafer
Attorney, Agent, or Firm—Young & Thompson

[57] ABSTRACT

A mower-conditioner for cutting and conditioning grass or other fodder comprises in combination a housing accommodating a cutting device (for example a bottom-driven disc-type rotary scythe device or a reciprocating cutter bar device) and a first conditioning device (for example a flail drum rotating about a horizontal axis and provided with pivotally-mounted flails), and a second conditioning device (for example a belt-driven fluted drum). The said first and second devices have at least one element (for example the said flail drum and driving belts or the like) in common. There are combs and grids to act on the cut fodder, and the mower-conditioner is readily adjustable for the treatment or production of different kinds of fodder.

6 Claims, 3 Drawing Figures

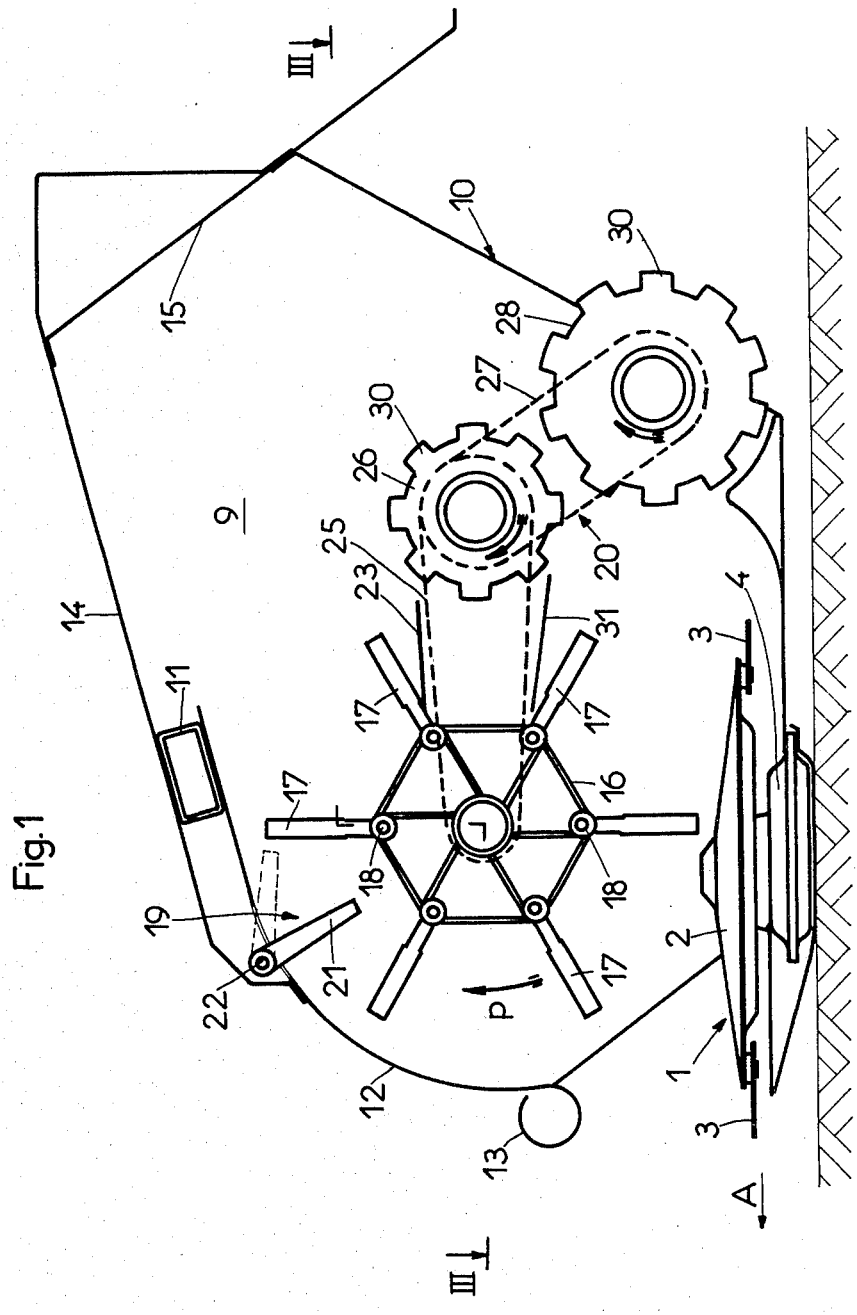

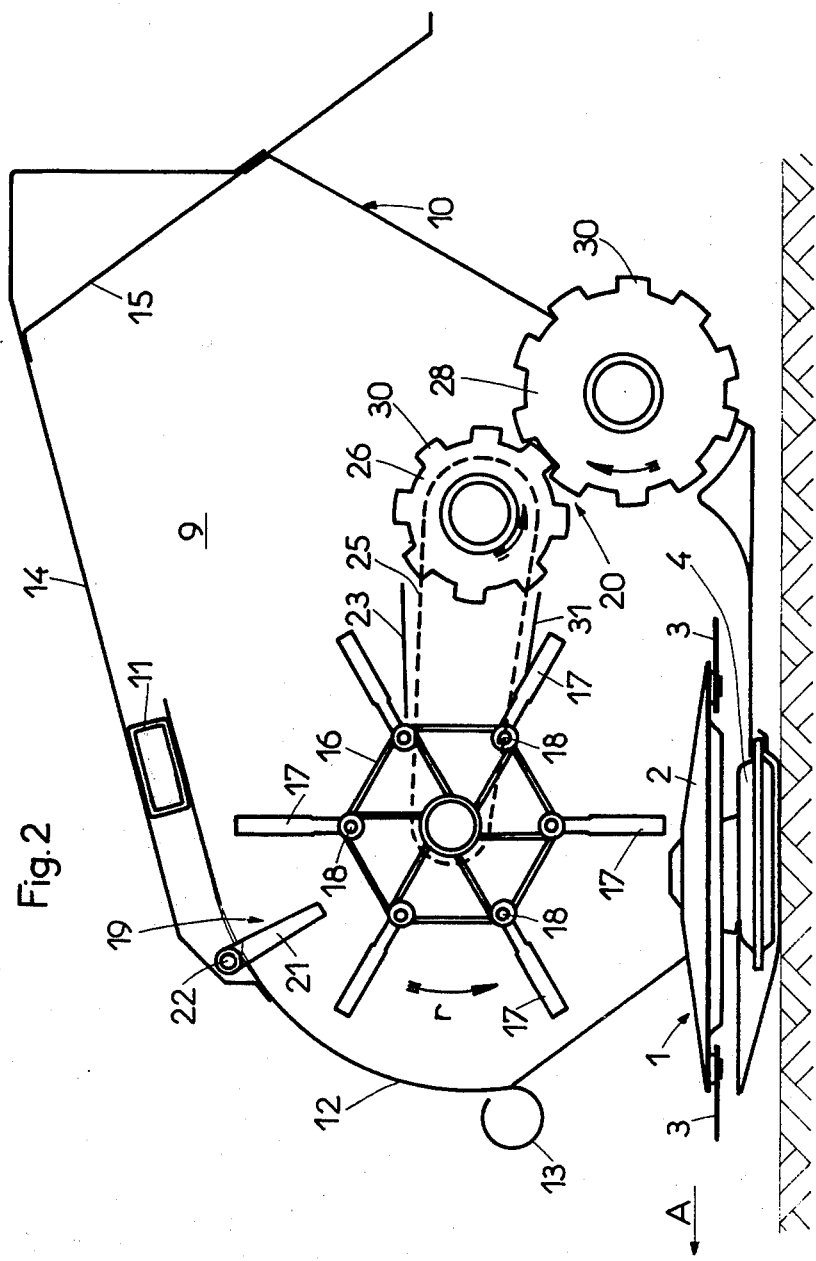

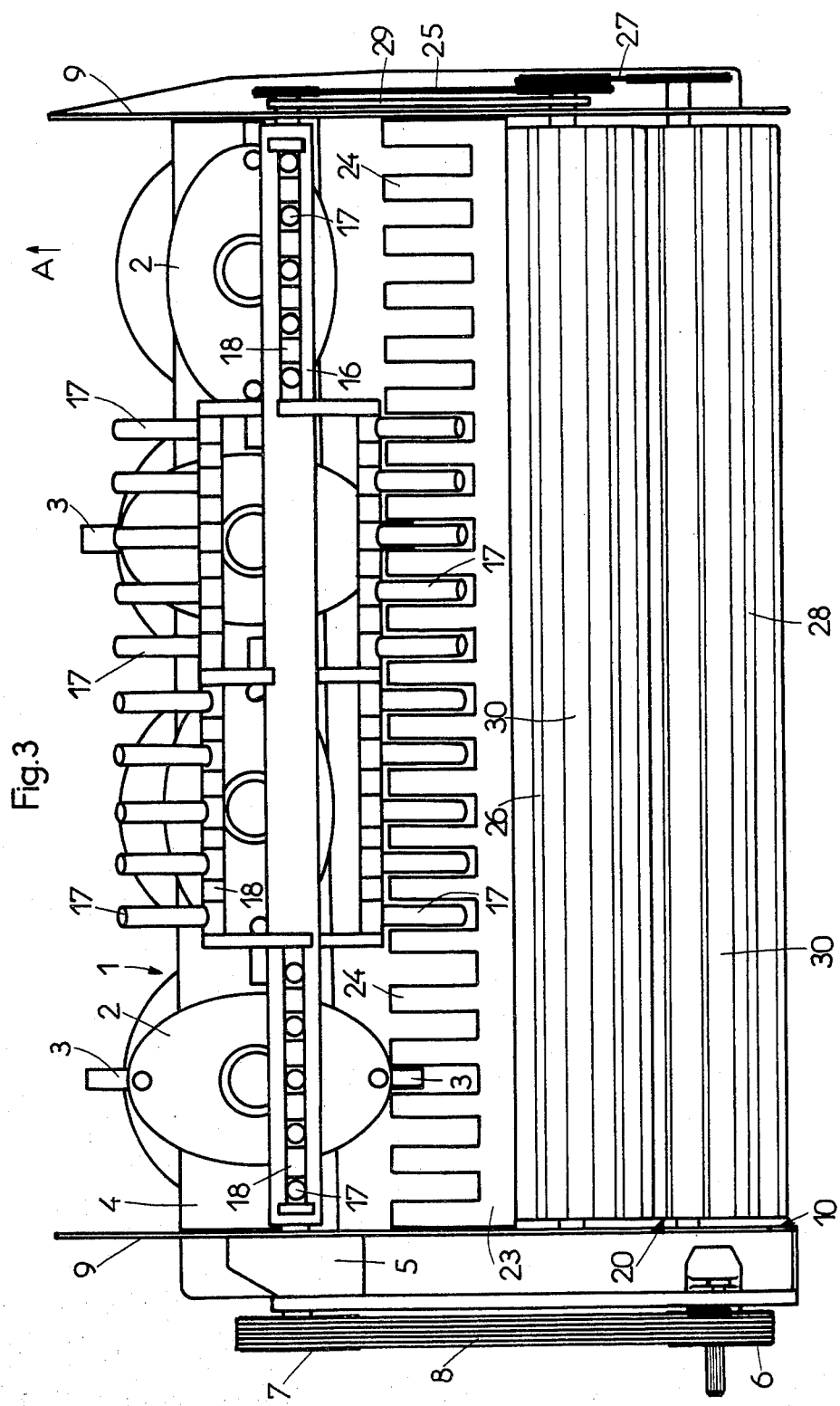

MOWER-CONDITIONER

INTRODUCTION AND BACKGROUND OF THE INVENTION

The present invention relates to machines for the harvesting and conditioning of fodder, and more particularly to mower-conditioners.

On the market there exist numerous mower-conditioners which are essentially of two types. Certain of them possess a conditioning mechanism of the roller type and are more particularly intended for harvesting the fodder called "artificial" such as lucerne or clover for example. The other category of mower-conditioners possesses a conditioning mechanism of the type comprising flails, tines or the like which may or may not cooperate with a comb the position of which is generally adjustable. These machines are more particularly intended for the harvesting of the fodder called "natural", such for example as grass.

The above-described two types of mower-conditioners have totally different operating principles. Thus the use of a machine of one certain type is not suitable for the fodder which normally should be conditioned with a machine of the other type. In fact the conditioning of lucerne for example with a mower-conditioner provided with a comb between the teeth of which the flails of a drum pass can have the effect of stripping the leaves from this type of fodder, which causes it to lose a part of its nutrient elements. Likewise the passage of grass between conditioning rollers has practically no effect upon the type of fodder, the drying of which is only very slightly accelerated.

The present invention has for object a mower-conditioner adapted to the harvesting of both "natural" and "artificial" fodder. According to another object of the present invention, the adaptation of this mower-conditioner is effected very easily, practically instantaneously and without dismantlement.

BRIEF SUMMARY OF THE INVENTION

According to the invention, the mower-conditioner comprising a cutter apparatus equipped for example with cutting elements driven about approximately vertical axes, and with a first conditioning apparatus adapted to one of the types of fodder, is at the same time provided with a second conditioning apparatus of which at least one element is common to the first conditioning apparatus. According to another characteristic of the invention one of the conditioning apparatuses is at least partly placed before or in advance of the other. These two apparatuses are situated at least partly in the immediate proximity of the conditioning element common to the said apparatuses, this element being capable of moving in two different manners. The common conditioning element is in fact driven in rotation on the one occasion in one direction and on the other in the other direction, according to the nature of the fodder to be conditioned.

On the machine according to the invention it is in fact possible to reverse the direction of rotation of the common conditioning element, for example of flail drum type, in order to cause the fodder to pass either through a first conditioning apparatus for example of the type comprising an adjustable comb cooperating with the said flails, or through crusher rollers.

FURTHER DESCRIPTION AND ADVANTAGES OF THE INVENTION

According to another noteworthy characteristic of the invention the conditioning apparatuses are placed at least partially in the path of the air current generated by the rotation of the common conditioning element, in order at least partly to constitute a kind of screen to this current of air.

This characteristic is of maximum interest for good operation of the machine according to the invention. In fact the element common to the two conditioning apparatuses in rotating generates a significant air current which has a certain influence upon the manner in which the fodder is presented at the entry of the machine. When the said element, which is for example in the form of a flail drum, rotates in a direction such that it entrains the fodder over its axis to pass it for example between the teeth of a comb, the other conditioning apparatus of the roller-type for example blocks the lower part of the conditioning passage. Thus these rollers modify the air current generated by the rapid rotation of the drum. The fodder penetrating into the machine thus remains in a position more favourable to its harvesting since the air current does not depart tangentially from the drum. Thus this air current has no tendency to flatten the fodder at ground level, so that its cutting is rendered easier, cleaner and tidier by reason of the fact that the fodder stems remain perpendicular to the ground.

Likewise when the flail drum rotates in a direction such that it entrains the cut fodder beneath its axis to pass it between the rollers, the comb of the other conditioning apparatus is directed radially in relation to the drum, which has the effect of modifying the air current before it reaches the zone in which the fodder penetrates into the machine.

As has just been seen above, one of the conditioning apparatuses prevents the air current generated by the flail drum from being ejected tangentially to the exterior when the fodder is directed through the other conditioning apparatus. The conditioning apparatus utilised to modify the effect of the air current generated by the drum does not eliminate this current but creates, at the level of the entry of the fodder into the machine, turbulence which is not troublesome to the cutting of the fodder and its entry into the machine.

Supplementary devices such as grids extending between the flails of the said drum are advantageously provided to attenuate still further the harmful effects of the air current generated by the rotation of the drum.

BRIEF DESCRIPTION OF THE VIEWS IN THE DRAWINGS

Further characteristics and advantages of the invention will appear below in the non-limitative description of an example of embodiment of the invention with reference to the accompanying drawings, wherein:

FIG. 1 represents a mower-conditioner, seen in section through a plane parallel to its direction A of travel, the said mower-conditioner being adapted in this FIG. 1 for the purpose of harvesting fodder called "natural", FIG. 2 represents a similar view to FIG. 1, the mower-conditioner being adapted however in FIG. 2 for the purpose of harvesting "artificial" fodder, FIG. 3 represents a plan view in section along III—III in FIG. 1, through a horizontal plane passing through the axis of the common conditioning element.

DETAILED DESCRIPTION OF THE PREFERRED EMBODIMENTS

As represented in the accompanying Figures, the mower-conditioner comprises a cutting device 1. The device as represented here by way of example is of the type comprising bottom-driven dics 2 provided with blades 3. Drive members such for example as pinions meshing with one another so as to form a cascade of pinions are located in a housing 4 extending beneath the discs 2. These drive members are arranged so as to cause each disc 2 to rotate in the opposite direction to the neighbouring discs 2, at least when the total number of discs 2 is even. These drive members are moreover driven through the intermediary of a gear box 5 receiving a certain power from the tractor (not shown) necessary for the operation of the machine moving in the direction of the arrow A, at least when it is in the working position. This power is transmitted to the gear box 5 through the intermediary of a set of pulleys 6 and 7 connected by belts 8. The pulley 7 the shaft of which engages in the box 5 is keyed on the same shaft as the drum 16 described in detail below, the direction of rotation of which can be reversed by means of a device of known type incorporated for example in the gear box 5.

The cutter device comprising discs 2 as described above can perfectly well be replaced within the scope of the present invention by a cutter device comprising oscillating blades or by a cutter device comprising a belt equipped with blades or any other device, provided that it carries out fodder cutting of good quality, especially without chopping the said fodder.

The support of the cutter device, in the present case the housing 4, extends at least partially between the lateral walls 9 of the frame 10 of the machine according to the invention. This frame 10 is especially constituted by a beam 11, visible in the upper part of FIGS. 1 and 2. The frame 10 is further constituted by a front hood 12 with rounded leading edge 13, the said hood 12 being prolonged towards the rear and upwards by a substantially plane part 14. At the rear of the machine a plate 15 is provided which is directed rearwards and downwards and against which the fodder is thrown when the said machine is adapted to cause the said fodder to pass above the axis of its conditioning drum 16.

The machine according to the invention in fact comprises a conditioning drum 16 driven in rotation by means of the pulley 7 about its approximately horizontal axis extending between the lateral walls 9 of the machine and approximately above the cutter device 1 comprising discs 2. This drum 16 is for example equipped with flails 17 articulated on spindles 18 approximately parallel with the rotation axis of the said drum 16. Thus when the drum 16 rotates its flails 17 extend radially under the action of centrifugal force. The fact of being articulated permits the said flails 17 to retract to the rear for example when they encounter an obstacle such for example as a stone. In fact the flails 17 of the drum 16 which constitutes the element common to the conditioning apparatuses 19 and 20 described below, serve to displace the fodder cut by the cutter device 1, through the machine.

According to the invention the machine is equipped with two distinct conditioning apparatuses 16, 19 and 16, 20 possessing a common element which is the drum 16 with flails 17. One of the conditioning apparatuses 16, 19 is constituted by the conditioning drum 16 which can for example cooperate with a comb 21 articulated about a spindle 22 which is substantially horizontal and parallel with the rotation axis of the drum 16. This comb 21 situated at the upper extremity of the hood 12 possesses teeth between which the flails 17 pass. Thus the fodder cut by the blades 3 of the discs 2 and then entrained by the drum 16 rotating in the clockwise direction as indicated by the arrow p in FIG. 1 passes between the teeth of the comb 21 which are directed more or less radially in relation to the rotation axis of the drum 16. The fodder stems thus treated and then projected on to the plate 15 are broken and freed of their wax skin. Thus they can dry more quickly than unconditioned fodder.

The degree of conditioning of the fodder which, before passing through the comb 21, rubs against the internal face of the hood 12 the radius of curvature of which is slightly greater than that of the trajectory of the flails 17, can be adjusted by regulating the position of the comb 21 as may be seen in FIG. 1. In the position as represented in dotted lines, that is to say when it extends substantially tangentially to the trajectory of the flails 17, the comb 21 causes the least vigorous conditioning. When it extends radially in relation to the trajectory of the flails 17 the teeth of the said comb 21 cause the most vigorous conditioning since the said teeth form a significant obstacle to the flow of the fodder through the machine.

It has been seen above that in order to cause the fodder to be conditioned, which is preferably "natural" fodder, to pass through the comb 21 it was necessary to drive the drum 16 in the direction of the arrow p. The rotation of this drum 16 equipped with flails 17 causes a significant air current which tends to depart tangentially from the drum 16. In order to avoid this phenomenon, especially in the zone where the fodder is on the point of entering the machine, before this zone in relation to the direction of displacement of the air current, that is to say approximately to the rear of the machine, there is installed a second conditioning apparatus 16, 20 which forms a kind of screen and brakes this air current or at least creates turbulence which is not harmful to cutting. The second apparatus 16, 20 thus brakes the air suction from the rear forward and favours the cutting of the fodder and its penetration into the conditioning passage of the machine, that is to say between its lateral walls 9. In fact when the air current generated by the rotation of the drum 16 is ejected tangentially to the exterior it tends to flatten the fodder in front of the machine. The cutting of the said fodder thus takes place under more unfavourable conditions than if the said fodder were to remain perpendicular to the ground. The second conditioning apparatus 20 thus avoids this tangential ejection of the air current and contributes to the harvesting of the fodder conditioned with the drum 16 and the comb 21.

Supplementary devices likewise avoid the effects of the said air current. Thus a grid 23 can be provided the teeth 24 of which (FIG. 3) extend between the flails 17 of the drum 16. The grid 23 is provided in the present example of embodiment of the invention above the conditioning device 16, 20. Without departing from the scope of the invention this grid 23 could also be installed at another region, provided that it is not an impediment to the passage of the fodder directed towards the conditioning device 16, 19 or 16, 20 and that the teeth 24 of the said grid 23 are directed approximately radially in the direction of the axis of the drum 16.

Without departing from the scope of the invention it will also be possible to provide a second grid 31 disposed on the trajector of the flails 17 and approximately at a level extending between the rollers 26 and 28. Further grids 23, 31 can likewise be provided, disposed in the trajectory of the air current generated by the flails 17 during rotation of the drum 16.

The conditioning apparatus 16, 20 has not only the object of reducing the air current generated by the rotation of the drum 16. In fact when the drum 16 is rotating in the direction of the arrow p, by means of a belt 25 or the like it drives a roller 26 of the said apparatus 16, 20, this roller 26 rotating in the same direction as the drum 16 and extending between the two lateral walls 9 of the machine. The roller 26, likewise with the aid of a belt 27 or the like, drives a second roller 28 having characteristics similar to those of the roller 26. The roller 26 likewise rotates in the same direction as the drum 16 and the roller 28. Thus the fodder ejected to the rear over the axis of the drum 16, which would fall upon the rollers 26 and 28, is discharged by these rollers towards the rear of the machine.

According to the invention the conditioning apparatus 16, 20 can also be directly used for the conditioning of "artificial" fodder such as clover or lucerne for example. For this purpose the direction of rotation of the drum 16 is reversed and directed in the direction of the arrow r (FIG. 2). Moreover the roller 26 is brought closer to the roller 28. The roller 26 is in fact mounted on at least one arm 29 (FIG. 3) articulated on the shaft of the drum 16. When the roller 26 is brought closer in the direction of the roller 28 it is easy to remove the belt 27. The two rollers 26 and 28 being in contact with one another, their ribs 30 mesh with one another so that the roller 26, driven from the drum 16 and in the same direction as the latter, drives the roller 28 in the opposite direction. The roller 28 can equally be driven in another manner known per se, for example directly from the gear box 5.

The conditioning apparatus 16, 20 operates in the following manner. Once the fodder is cut by the blades 3 of the discs 2, it is displaced to the rear by reason of the action of the drum 16 rotating in the anti-clockwise direction considered in FIG. 2.

The drum 16 then causes the fodder to pass beneath its axis and directs it towards the rollers 26 and 28 between which the fodder passes. In its passage between these rollers 26 and 28, the pressing force upon one another of which is adjustable, the fodder stems are burst permitting more rapid drying without risk of defoliation, which is very suitable especially to "artificial" fodder.

In the treatment of the fodder by the conditioning apparatus 16, 20, the comb 21 is used to attenuate the harmful effects of the air current generated by the rotation of the drum 16 in the direction of the arrow r. For this purpose the comb 21 is placed in a radial position (FIG. 2) so that its teeth are directed towards the axis of the drum 16. In this way the comb 21 has maximum efficiency to prevent the air current generated by the rotation of the drum 16 from departing tangentially from the drum and disturbing the entry of the cut fodder into the machine.

Thus the conditioning apparatus 19 likewise contributes to good operation of the machine when the fodder passes through the conditioning apparatus 16, 20.

In the above-described example of embodiment of the invention the conditioning apparatus 16, 19 with comb 21 is disposed forward of the axis of the drum 16 and forward of the conditioning apparatus 16, 20 with rollers 26, 28. The apparatus 16, 19 is also disposed higher than the conditioning apparatus 16, 20. More precisely the apparatus 16, 19 is disposed above the axis of the drum 16 while the apparatus 16, 20 is disposed beneath the said axis. The apparatus 16, 19 is moreover disposed on one side of the axis of the drum 16 and the apparatus 16, 20 is disposed on the other side of the said axis. However without departing from the scope of the invention the two apparatuses 16, 19 and 16, 20 could be disposed on the same side of the axis of the drum 16.

The transformation of the machine to harvest "natural" fodder passing for example through the comb 21 of the conditioning apparatus 16, 19 is effected very simply. It is in fact sufficient to reverse the direction of rotation of the drum 16, to mount a belt 27 between the rollers 26 and 28 and to tension this belt by pivoting the said roller 26 upward in relation to the axis of the drum 16, which likewise has the effect of spacing the roller 26 from the roller 28. Without departing from the scope of the invention it will also be possible to remove the roller 28 towards the rear so that it no longer meshes with the roller 26. The rollers 26, 28 might also remain in engagement when the conditioning apparatus 16, 19 is in use.

Thus the present invention relates to a mower conditioner which easily permits the treatment of two kinds of totally different fodder without thereby necessitating significant transformation. Moreover it is quite apparent that various improvements, modifications or additions will be capable of being effected in the above-described example of embodiment without thereby departing from the scope of the invention, provided that there are two distinct conditioning apparatuses each possessing a conditioning element common to the two said apparatuses.

Although the above-described two conditioning apparatuses possess on the one hand a comb and on the other rollers, other devices can be used without departing from the scope of the present invention.

What is claimed is:

1. Mower-conditioner comprising a cutter device and a drum, means for selectively driving the drum in rotation in either the one direction or the other about a horizontal axis perpendicular to the direction of travel of the machine, the said drum, provided with radially extending flails, cooperating with a first conditioning apparatus comprising two rollers, one of them being at least partially situated lower than and behind the axis of the drum, the said drum cooperating simultaneously with a comb situated higher than and before the axis of the drum, the flails passing between the teeth of the comb, and means for driving the rollers in rotation in opposite directions to one another in order to pass the fodder between them from beneath the axis of the drum when the drum is rotating in a direction to pass fodder beneath the axis of the drum and to drive said rollers in rotation in the same direction as each other and as the drum when the drum is rotating in the other direction to pass the fodder above the axis of the drum.

2. Mower-conditioner according to claim 1, wherein the position of the rollers can be adjusted, it being possible for at least one of the rollers to be removed from the other when the drum causes the fodder to pass over its axis.

3. Mower-conditioning according to claim 1, wherein supplementary devices intended to form a screen to the air current generated by the rotation of the flailed drum are constituted by at least one grid the teeth of which extend between the said flails.

4. Mower-conditioner according to claim 3, wherein the grid is disposed above the rollers.

5. Mower-conditioner according to claim 3 or 4, wherein a second grid extends substantially at a level situated between the rollers.

6. Mower-conditioner according to claim 1, the said comb being capable of extending between a position tangential to the trajectory of the flails of the drum and a radial position directed towards the axis of the drum.

* * * * *